(12) United States Patent
Yotov

(10) Patent No.: US 12,002,047 B1
(45) Date of Patent: Jun. 4, 2024

(54) SYSTEM AND METHOD FOR BLOCKCHAIN-VERIFIED DIGITAL-IDENTITY-AND-DERIVATIVES ARCHETYPE-BASED TRANSACTION PROCESSING AND IMPLEMENTATION WITH THE AID OF A DIGITAL COMPUTER

(71) Applicant: Todor Yotkov Yotov, Sofia (BG)

(72) Inventor: Todor Yotkov Yotov, Sofia (BG)

( * ) Notice: Subject to any disclaimer, the term of this patent is extended or adjusted under 35 U.S.C. 154(b) by 163 days.

(21) Appl. No.: 17/846,915

(22) Filed: Jun. 22, 2022

Related U.S. Application Data

(60) Provisional application No. 63/213,374, filed on Jun. 22, 2021.

(51) Int. Cl.
  *G06Q 20/00* (2012.01)
  *G06Q 20/40* (2012.01)
  *H04L 9/00* (2022.01)

(52) U.S. Cl.
  CPC .......... *G06Q 20/401* (2013.01); *H04L 9/50* (2022.05); *G06Q 2220/00* (2013.01)

(58) Field of Classification Search
  USPC .......................... 705/16, 21, 59; 380/44, 262
  See application file for complete search history.

(56) References Cited

U.S. PATENT DOCUMENTS

2017/0235537 A1* 8/2017 Liu ................. G06F 3/1454
  715/759

OTHER PUBLICATIONS http://web.archive.org/web/20210518070405/https://en.wikipedia.org/wiki/Private_equity, cached on May 18, 2021.
http://web.archive.org/web/20210621022953/https://en.wikipedia.org/wiki/Blockchain , cached on Jun. 21, 2021.
http://web.archive.org/web/20210615133154/https://en.wikipedia.org/wiki/Smart_contract, cached on Jun. 15, 2021.
http://web.archive.org/web/20210505205653/https://en.wikipedia.org/wiki/Cryptographic_primitive , cached on May 5, 2021.

* cited by examiner

*Primary Examiner* — Dante Ravetti
(74) *Attorney, Agent, or Firm* — Leonid Kisselev

(57) ABSTRACT

The platform described provides the security, verifiability, and computational speed necessary to implement transactions involving derivatives of private equity assets using smart contracts. All relevant data necessary for the performance of the transactions are converted into encrypted machine-readable digital identities that are stored in a data storage and a blockchain storage. References to location within the storages of the digital identities are included in a derivatives archetype associated with one derivative instrument. Price of the derivative instrument can similarly be determined using a pricing archetype that references locations of the digital identities of data items as well as the formula necessary for the determination of the price. The pricing engine further leverages digital identities price proxies for the underlying from publicly available data. Data security can further be amplified through a use of multi-primitive crypto mapping. The price and the derivatives archetype are used to create a smart contract.

20 Claims, 6 Drawing Sheets

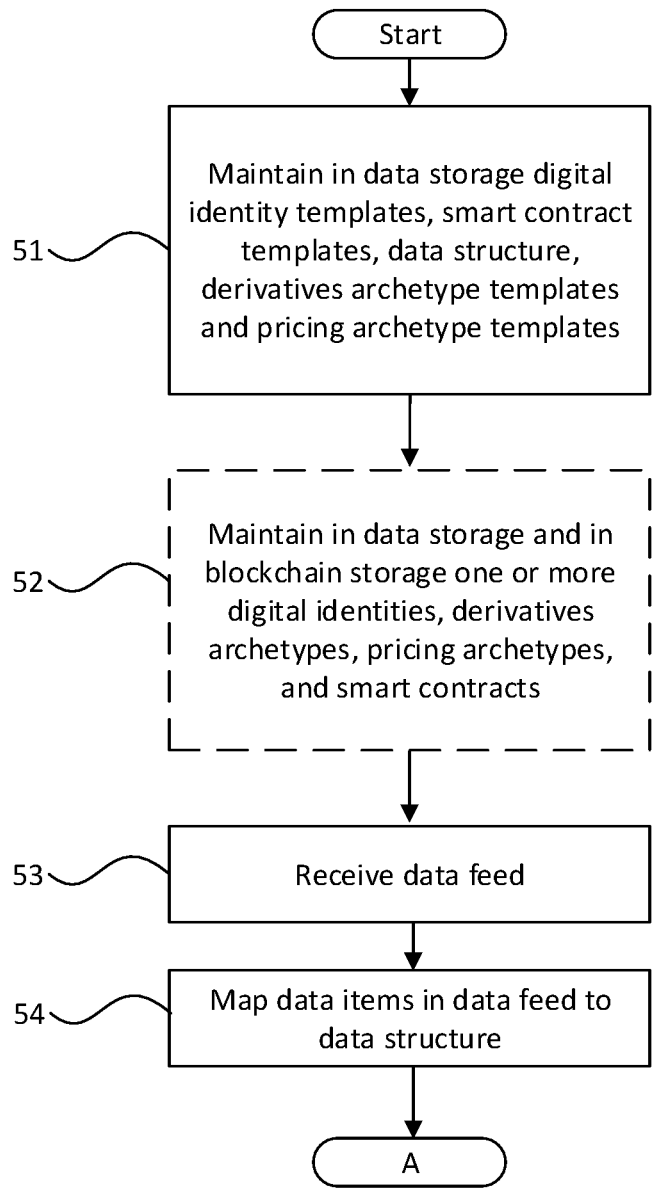

SYSTEM AND METHOD FOR BLOCKCHAIN-VERIFIED DIGITAL-IDENTITY-AND-DERIVATIVES ARCHETYPE-BASED TRANSACTION PROCESSING AND IMPLEMENTATION WITH THE AID OF A DIGITAL COMPUTER

CROSS-REFERENCE TO RELATED APPLICATION

This non-provisional patent application claims priority under 35 U.S.C. § 119(e) to U.S. Provisional Patent application, Ser. No. 63/213,374, filed Jun. 22, 2021 the disclosure of which is incorporated by reference.

FIELD

This application relates in general to encryption technology, and, in particular, to a system and method for blockchain-verified digital-identity-and-derivatives-archetype-based transaction processing and implementation with the aid of a digital computer.

BACKGROUND

Few industries could benefit as much from the use of up-to-date information, high data security, and transparency as private equity investment. Private equity investment refers to investments in assets that are not publicly traded and can include assets such as direct private equity investment, private equity fund or holdings, real estate investments or funds, structured products, infrastructure projects and alike illiquid, non-transparent investment opportunities. Generally, such investments are available only to entities with a high amount of available capital (generally for investors who are willing to commit as much as $25,000,000 or, even in the case with high net-worth individuals, for those with an "accredited investor" status) due to the large amount of due diligence that needs to take place before a party is allowed to participate in such investment as well the complexity in estimating the values of the assets involved and the management of such transactions. Due to their complexity, such transactions further often lack transparency and are hard to verify for an investor.

The high entry barrier to private equity investment could potentially be lowered by allowing investment on derivatives of the underlying private equity asset ("underlying" from here on), with derivatives (also referred to as "derivative instrument") being a financial instrument such as options, futures, and forwards that derive their value from the value of the underlying. The barrier to entry could be lowered due to derivative instruments not necessarily providing direct exposure to the underlying, and not involving opening claims to the underlying However, derivatives on private equity assets are not widely adopted, if at all, due to the complexities in pricing of the derivatives based on non-tradable assets and the inability to establish such a market within the traditional financial markets avenues which depend on liquidity of the underlying assets. Pricing difficulties are associated with the fact that the underlying is not tradable, there are large discontinuities in the price when corporate actions are observed, and in the case of expiration at a given day, other than that of an actual private equity transaction, the estimation for the underlying can be manipulated. Furthermore, complexities in the underlying pricing model would make such derivatives interesting to only a few sophisticated investors, who can validate the price or establish a methodology for price discovery, which would further limit the derivative's liquidity. In addition, complexity, lack of transparency, and need to verify the identities of the parties involved in the transaction and provide segregated and dynamically vetted access to the derived data, analytics, values and trading instruments, pose sustainable challenges to the creation and adoption of a robust private equity derivatives framework. Thus, currently, private equity investment generally remains out of reach of most investors who would be able to greatly benefit from them during the current global uncertainty and COVID-19-related economic troubles.

While computer-driven transactions have long-entered the financial world, no solution adequate for the challenges described above has yet been proposed. For example, blockchain technology has been used to improve transparency in many industries by cryptographically linking together records (referred to as "blocks") of data, with each block including a timestamp and a reference to the block preceding the block. While the use of blockchain allows to check and analyze transactions that are referred by the blocks, referencing the blockchain takes significant time and computational references, making conventional blockchain techniques inadequate when a large amount of heterogeneous data needs to be analyzed and acted upon in real-time.

Attempts have been made to increase the speed with which blockchain is referenced by storing similar kinds of data in the same blocks. For example, images could be stored in the same block as other images and stock market indices would be stored with other stock market indices. However, this approach still proves inadequate when a large amount of heterogeneous data needs to be accessed at the same time, such as for allowing a transaction involving a derivative on a private equity asset, with all the applicable terms and conditions, representations and warranties, and the intricacies of data handling, validation and disclosure, and the maintenance of a complex pricing mechanism apparatus. This challenge is further exacerbated by the data stored on the blockchain being encrypted in conformity with standards encompassing the domain-specific challenges with the data's sensitivity, risk management, and compliance and auditing considerations, with the time necessary to extract and validate additional data from the blockchain further increasing. In such situations when homogenous records are stored together, an extensive, time and computational resources-consuming search of the blockchain records would be required to obtain the required data, and the amount of time that would pass could make the result no longer relevant due to the information produced being already outdated.

Accordingly, there is a need for a way to provide a way to implement transactions on derivatives of private equity assets with high security and verifiability yet without sacrificing the computational speed needed for real-time implementation of such transactions.

SUMMARY

The platform described below provides the security, verifiability, and computational speed necessary to implement transactions involving derivatives of private equity assets using smart contracts. All relevant data necessary for the performance of the transactions, including identifiers of parties who are allowed to participate in the transactions at any given time, are converted into machine-readable digital identities that are stored in encrypted form in a data storage and a blockchain storage. References to location within the storages of the digital identities are included in a derivatives archetype associated with one derivative instrument, allowing to quickly locate all data necessary for the transaction within both the blockchain storage and the data storage. Price of the derivative instrument can similarly be determined using a pricing archetype that includes machine-readable references to the digital identities of data items as well as the formula necessary for the determination of the price, allowing the pricing engine to reference all necessary data within the blockchain and data storage in a computationally-efficient manner. The pricing engine further leverages digital identities price proxies for the underlying from publicly available data to calculate the pricing of the derivative instrument. Security of the data stored by the platform can further be amplified through a use of multi-primitive crypto mapping, which provides sufficient data security for even data stored exclusively in the data storage. The price and the derivatives archetype are further used to create the smart contract for the derivative instrument referenced by the derivatives archetype. The use of the blockchain further provides a record of all the transactions and factors used to implement those transactions, thus providing much-needed transparency to the transactions. As a result, the platform provides a powerful, verifiable, real-time way to participate in transactions involving derivatives of private equity assets without the barriers to entry associated with conventional private equity investment mechanisms.

In one embodiment, a system and method for blockchain-verified digital-identity-and-derivatives-archetype-based transaction processing and implementation with the aid of a digital computer is provided. The system includes: a data storage configured including one or more digital identity templates, and one or more smart contract templates, a data structure including a preset taxonomy, and one or more of a plurality of digital identities encrypted using an encryption algorithm, each digital identity including at least two data arrays and metadata including a connection between at least two of the arrays and machine-readable instructions for processing the digital identity by one or more processors, the data storage further configured to store derivatives archetype templates, and pricing archetype templates; a blockchain storage configured to store and implement a distributed ledger including a plurality of blocks encrypted using the encryption algorithm, each of the blocks including a cryptographic hash of an immediately preceding one of the blocks in the ledger, at least some of the blocks including one of the encrypted digital identities; and the one or more processors interfaced to a memory within which code for execution by the processor is stored, the one or more processors interfaced to the data storage and the blockchain storage. The one or more processors are configured to: receive a data feed from at least one external data source, the data feed including one or more data items, at least some of the data items associated with an underlying private equity asset ("underlying") of a derivative instrument, at least some of the data items associated with the derivative instrument, at least some of the data items associated with an identifier of the external source, and at least some of the data items including an identification of a party who produced at least a portion of the data feed; map the received data items to the data structure, confirm that the data items conform to the data structure taxonomy, and store the conforming data items within the data storage in accordance to the mapping; determine using the mapping whether at least some of the data items are associated with one or more of the digital identities; for those of the data items that are associated with at least one of the digital identities, determine whether those data items are included in one of the arrays included in that digital identity; update the digital identities within the blockchain storage and within the data storage using the data items associated with those digital identities and that are not included in one of the arrays of the digital identities; use at least some of the data items not associated with the digital identities to create further ones of the digital identities using one of the digital identity templates; encrypt the further ones of the digital identities with the encryption algorithm and store the further ones of the digital identities within the data storage and the blockchain storage; create a pricing archetype using one of the pricing archetype templates, the pricing archetype including a formula for estimating a price of the derivative instrument, one or more fixed elements of the formula, and machine-readable reference to a location within at least one of the data storage and the blockchain storage of digital identities of the data items to be used by at least one engine deployed for pricing of the derivative instrument; encrypt the pricing archetype with the encryption algorithm and store the pricing archetype within the blockchain storage and the data storage; compare the digital identities within the data storage to the digital identities within the blockchain storage; upon the digital identities in the data storage being identical to the digital identities within the blockchain storage, create a derivatives archetype using at least some of the digital identities and one of the derivatives archetype templates, the derivatives archetype including machine-readable references to locations of items including: the digital identity for the derivative instrument, the digital identity for the underlying of the derivative instrument, digital identities of the data items to be used by the engine deployed for the pricing of the derivative instrument, digital identities of parties that have the rights to access information related to the underlying, and the pricing archetype, wherein at least some of the references list both the location within the blockchain storage of one of the items and the location within the data storage for that item; encrypt the derivatives archetype using the encryption algorithm and store the derivatives archetype within the blockchain storage and the data storage; use the pricing archetype to determine the price of the derivative instrument referenced within the derivatives archetype; create at least one smart contract for the derivative instrument using the derivative instrument price and the derivatives archetype referencing the derivative instrument, wherein the locations of at least some of the items within both the blockchain storage and the data storage are accessed during the creation of the smart contract; make the derivative instrument available for exchange transactions between multiple parties eligible to access data associated with the derivative instrument using the smart contract; report outcome of each of the exchange transactions in accordance with the smart contract.

Still other embodiments will become readily apparent to those skilled in the art from the following detailed description, wherein are described embodiments by way of illustrating the best mode contemplated. As will be realized, other and different embodiments are possible and the embodiments' several details are capable of modifications in various obvious respects, all without departing from their spirit and the scope. Accordingly, the drawings and detailed description are to be regarded as illustrative in nature and not as restrictive.

DETAILED DESCRIPTION

Smart contracts powered by computationally-efficient grouping of heterogeneous data, blockchain, and multi-primitive crypto mapping allow for real-time, secure, transparent private equity derivative instrument transactions without the high barriers to entry inherent to traditional private equity investment.

Figure 1:
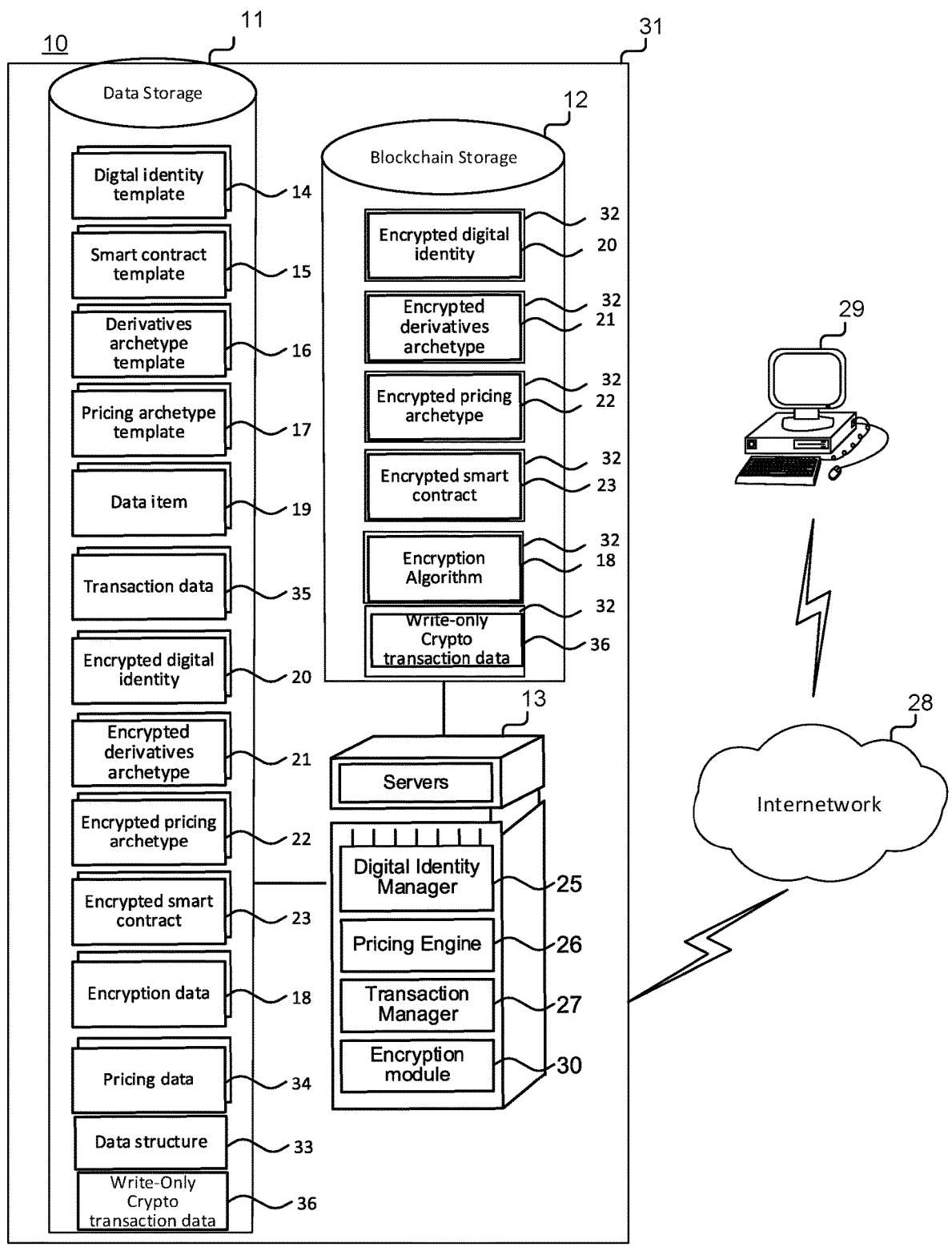
FIG. 1 is a block diagram showing a system for blockchain-verified digital-identity-and-derivatives-archetype based transaction processing and implementation with the aid of a digital computer in accordance with one embodiment.

FIG. 1 is a block diagram showing a system 10 for blockchain-verified digital-identity-and-derivatives-archetype based transaction processing and implementation with the aid of a digital computer in accordance with one embodiment. The system includes a platform 31 for blockchain-verified digital-identity-based derivatives archetype transaction processing and implementation.

The platform 31 includes a data storage 11, a blockchain storage 12, and one or more servers 13 interfaced to the data storage 11 and the blockchain storage. The data storage 11 can be a database that can store both encrypted and unencrypted data. The blockchain storage stores and implements a distributed ledger that can be used both by the servers 13 to read in real-time data required for the processing being performed as well as by other authorized parties (such as interfacing with the servers 13, though other ways to access the blockchain are also possible) to verify what data was used to form and implement the smart contracts. As further described below, data stored in the blockchain storage are stored as blocks 32, with each block 32, in addition to the data of interest (such as the items represented by numerals 18 and 20-23 in FIG. 1) including a cryptographic hash of the immediately preceding block 32 and a time-stamp of when that block 32 was created, which allows to verify the existence of all data stored in the blockchain, and provides transparency to all transactions using that data.

The data storage 11 and the blockchain storage 12 both store encrypted smart contracts 23 that are created by the one or more servers 13 using smart contract templates 15 as further described below. The smart contracts 22 are also implemented by the one or more servers as further described below. Each smart contract 23 is a computer program that automatically executes legally relevant events and actions according to particular agreed-upon terms. While the description below focuses on smart contracts 23 governing trading transactions involving derivatives of private equity assets, smart contracts 23 can cover a variety of transactions. For example, smart contracts 23 can cover data submission (such as data items 19) between platform 31 and data provider, feed, or individual agent submitting data, and the definitions of the terms and conditions for data utilization and disclosure, with or without ensuing monetary compensation to the data provider, feed, or individual agent submitting data, including eligibility criteria for the disclosure of raw and derived data and pricing and analytics based thereto to third parties. Smart contracts 23 can also cover payments from accounts associated with the platform 31 to the data provider/discloser for submitting data or for having said data utilized across the platform 31. Still further smart contracts 23 can cover data disclosure between the platform 31 and a party using the platform (such as via an external computer 29 interacting with the platform 31 via the Internetwork 28 such as the Internet or a cellular network) on the platform 31 or accessing, visualizing, analyzing derived data from a certain data provider by the platform 31, Smart contracts 23 can also cover terms and conditions related to the eligibility of access by a party to a certain derivatives archetype 21 (described below). Smart contracts 23 can also cover terms and conditions for transactions such as the trading of a certain derivative instrument (including a derivative instrument prescribed and referenced by the derivatives archetype 21), including the eligibility of different procedures for order creation, order management, settlement, as well as other possible transactions, such as mapping and synchronization with an Order Management System (OMS) and the trading system. Smart contracts 23 can also govern the long and the short side to each standardized transaction using a derivatives archetype 21. Smart contracts 23 can also govern transactions with third parties providing margin liquidity, or other domain-specific services where any object within the platform 31 is used as collateral for trading activities. Smart contracts can also cover tokenization of the derivative instruments, including via the issuance of digital tokens to be stored on the blockchain storage 12, where each of these tokens represents a preset fraction of the price of the derivative instrument as derived from the pricing archetype. Smart contracts 23 can also cover the mechanism for charging transaction validation and processing fees (a.k.a. "gas fees") for each transaction using the blockchain storage 12, thus governing interactions between the platform 31 and the participants on the trading platform. Smart contracts 23 can also cover eligibility and utilization of encrypted digital identities within pricing archetypes 22. Some smart contracts can also cover updating the pricing archetypes 22 in conformity with the setups and limitations prescribed by the pricing archetype templates 17 and procedures within the pricing archetype 22 for updating the scope of the elements of the pricing archetype 22 upon reaching preset thresholds used as a trigger for pricing archetype 22 update procedures. Smart contracts 23 can also cover a procedure allowing the owners of private equity or another underlying instrument and claims thereto (which can be the same party as the party providing data items 19 when those are not standardized data feeds) to create digital identities templates 14 or submit or construct digital archetypes templates that are then validated by the platform 31. Smart contracts 23 can also cover procedures, workflows and setups governing the smart contract management and administration within the platform 31. Smart contracts 23 can also cover procedures, workflows and setups governing the platform 31. Smart contracts 23 can also cover procedures, workflows and setups governing engines within the platform 31 providing the tokenization and the consequent token validation, management and reporting processes. In one embodiment, one smart contract 23 can cover only one of the areas listed above. In a further embodiment, a single smart contract 23 can cover multiple areas listed above. A smart contract template 15 has all of the information that is present within the smart contract 23 formed using that template 15 except for the unique identifiers of the derivatives archetypes 21 referenced as part of the smart contract 23, or the unique identifiers of one or more digital identities 20 referenced as part of the smart contract 23.

The data storage 12 stores encrypted digital identities 20 of entities processed by the platform during formation and execution of smart contracts 23 and digital identity templates 14 necessary for creation of digital identities 20 of a particular type. While the digital identity templates 14 are unencrypted and are stored only in the data storage 11, encrypted digital identities 20 are stored in both the data storage 11 and the blockchain storage 12. The entities for whom the digital identities are created can include derivative instruments (synthetic or standard, tokenized or non-tokenized), the underlying of the derivative instrument, identification of parties interacting directly with the platform 31 (such as parties providing data items 19 to the platform 31 or parties that are authorized to participate in trading for involving one of the smart contracts), data items 19 used by at least one pricing engine 26 executed by the one or more servers and deployed for the pricing of the derivative instrument, and news information and other volumes of heterogeneous data obtained from third party sources, though still other entities represented by the digital identity are possible.

While the digital identities 14 can be of different types, the digital identities 14 all share the same structure and a minimum set of identical properties. In particular, each digital identity includes at least two arrays of data and metadata. The metadata includes information how each array is related to another array. For example, if one array includes primary identifiers (identifiers of a type of information, such as a identifying a price of a particular resource at a given point of time), the other array can include the value for said identifiers such as a digit representing the price of that particular resource at the given point of time. The metadata in that digital identity includes machine-readable information of how the arrays are connected to each other (such as which value in one array corresponds to the type of value in another array) and also about the formats of different data pieces in the array (for example, such format can be true/false, integer, how many characters are there, and logical state). The metadata further includes machine-readable instructions (with the term machine-readable as used within this application meaning including preset conventions for data integrity, data connectivity, allowed interfaces and mapping procedures, and triggers thereto) of how the digital identity 14 is to be used. Such instructions can include an identification code of the digital identity 20, which identifies the type of the digital identity 20, time period when digital identity 20 is created, and the interfaces and procedures enabling the digital identity 20 to be recognized and managed as a data unit by the encryption module 30. As the identification code can be used to quickly identify information about a particular digital identity 20, the code can be used for grouping together identities 20 with similar traits during search and analysis.

As a result of including machine-readable instructions for utilization of a digital identity 20, the metadata for a digital identity of a derivative instrument can specify that the digital identity needs to be included in a particular portion of a derivatives archetype 21 (described further below) and later possibly tokenized. The machine-readable instructions in the metadata can further include instructions for creating at least some of the values included in the digital identity 20, such as mathematical formulas used to generate some values for an array within that identity. The digital identity templates 14 include the same information as digital identities except that the array where values for the types of information described in the other array are not filled out and portions of the metadata referencing to when the digital identity is created are also blank. In addition, the digital identity templates 14 include the mapping information for the relevant subset of the taxonomy governing all the data items 19 in accordance with the data structure 33. Thus, digital identity templates 14 that will be used for creation of digital identities of different types will have different metadata as well as different primary identifiers.

Figure 2:
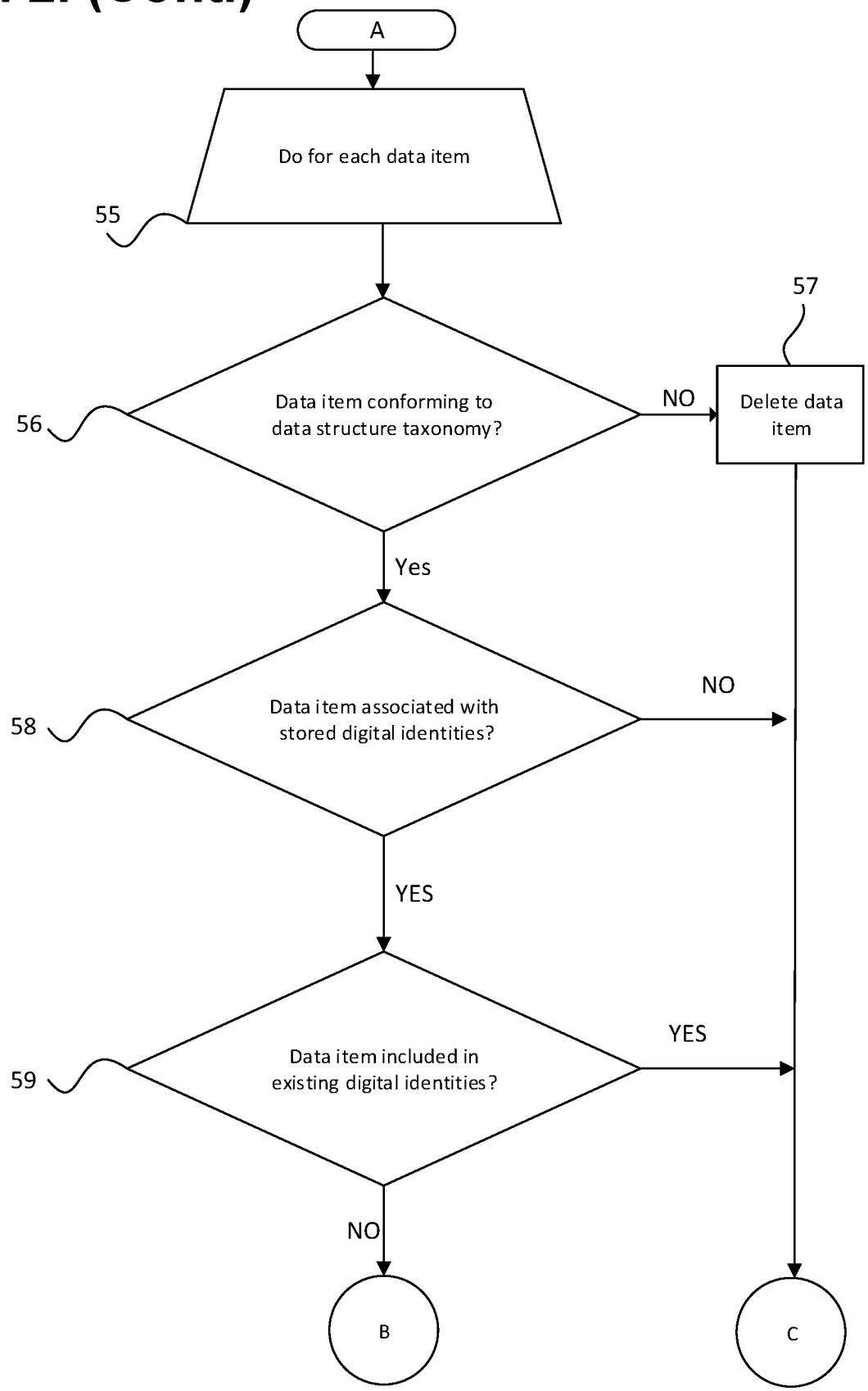
FIG. 2 is a flow diagram showing a method for blockchain-verified digital-identity-and-derivatives-archetype-based transaction processing and implementation with the aid of a digital computer in accordance with one embodiment.
Figure 2:
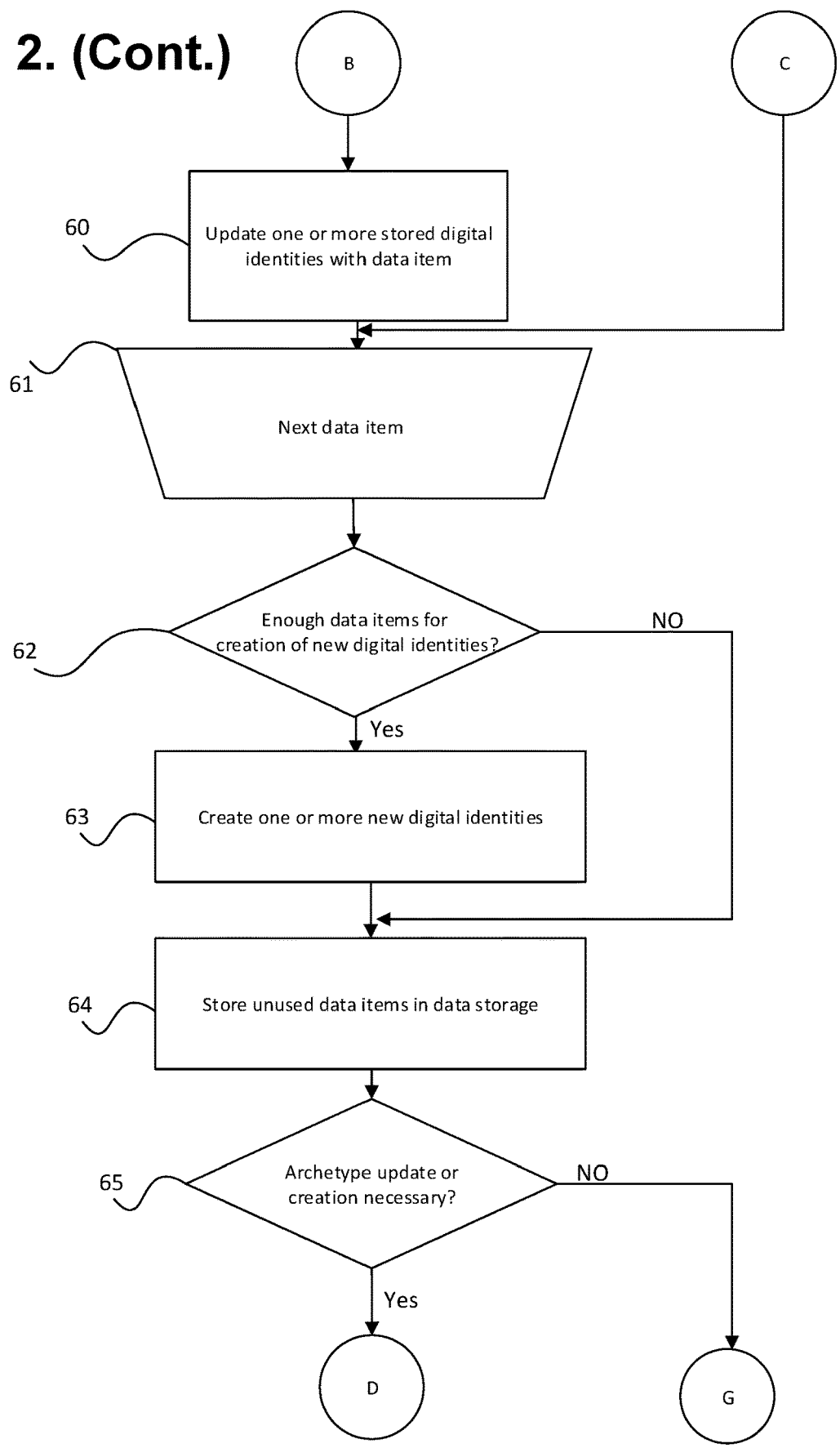
Figure 2:
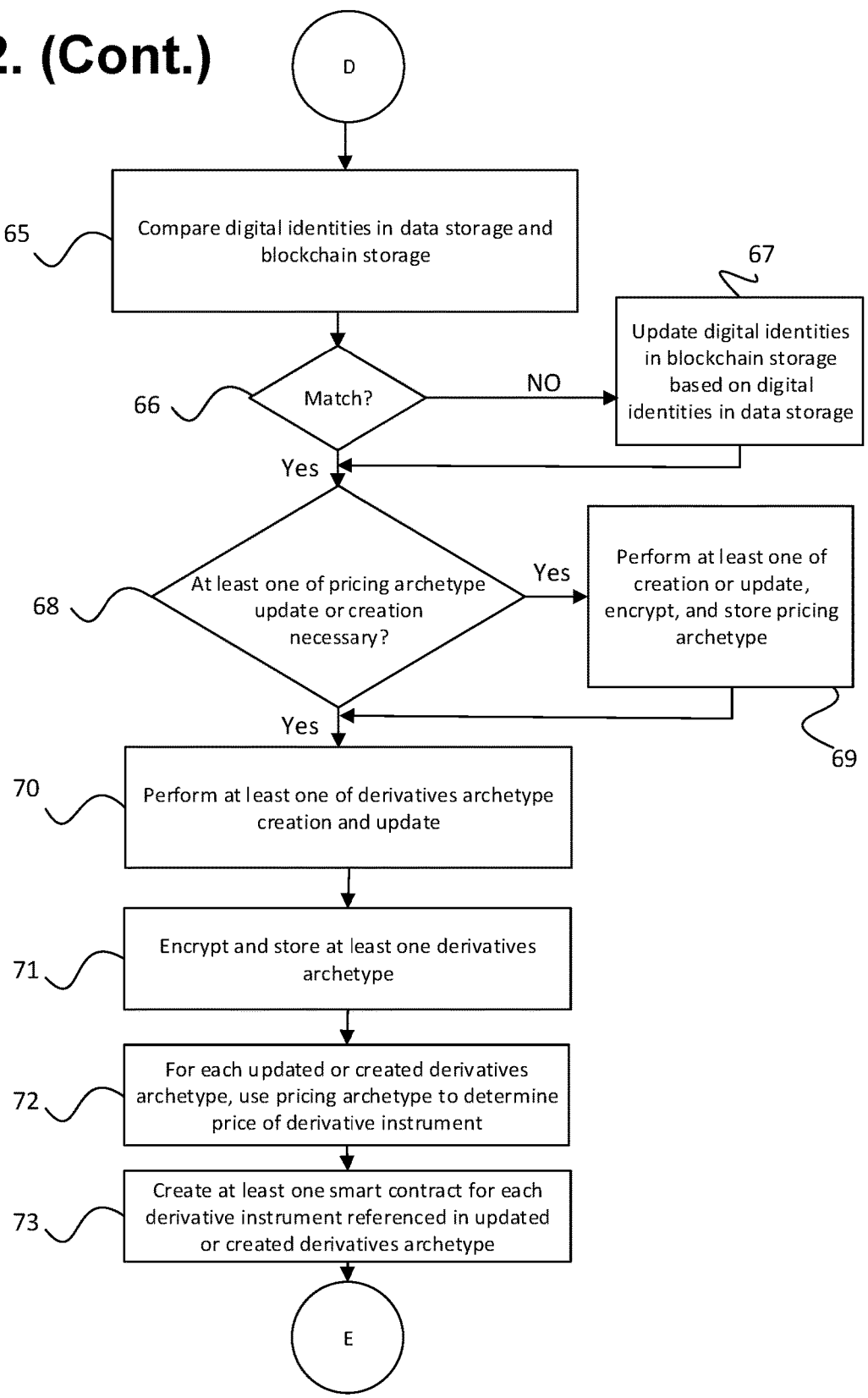
Figure 2:
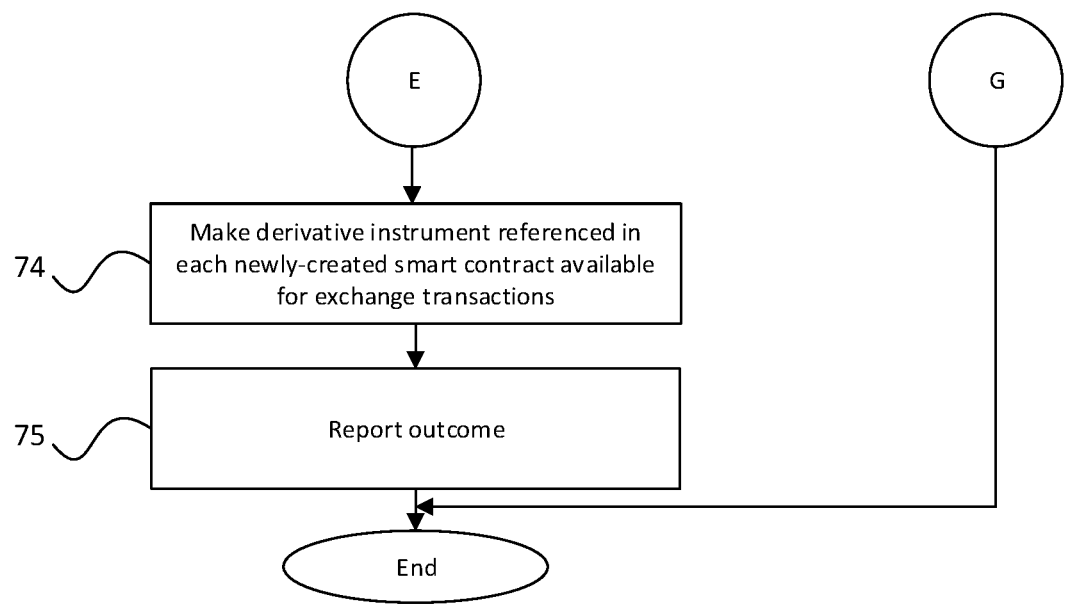

The filling out of the digital identity templates 14 to create the digital identities 20 is performed by the digital identity manager 25 implemented by the one or more servers 13, as further described with reference to FIG. 2. Briefly, the digital identity manager 25 receives a data feed that includes one or more data items 19 from an external source. In one embodiment, the digital identity manager 25 can include an API that communicates with external computing devices 29 to receive the data feed via an Internetwork 28 such as the Internet or a cellular network. In a further embodiment, the digital identity manager 25 can receive the data feed in other ways, including as flat files, including via recorded computer-readable medium (such as flash drives, CD-ROMS). Still other ways for the digital identity manager to receive the data feed are possible.

The data storage 11 further stores a data structure 33 that includes a preset taxonomy that services all storages and interactions within the platform 31. For example, the taxonomy describes all the data classes, types of data objects and data relations, the formats of each possible entry on the databases stored and managed as part of the data storage 11, and the corresponding data structures, objects, mapping conventions and metadata for the blocks 32 stored on the blockchain storage 12. Upon receiving the data feed, the digital identity manager 25 maps the data items in the data feed to the data structure, classifying each data item in accordance with the taxonomy. If a data item cannot be classified in accordance with the taxonomy in the data structure 33, that particular data item is not used further and can be deleted. The digital identity manager 25 also checks whether those of the data items that are successfully mapped to the data structure 33 are associated with one or more of the existing digital identities 20 based on the taxonomic class (in the data structure 33) associated with that data item 19 and the taxonomic class associated with those digital identities 20. For example, if a data item 19 is a representation of the valuation of a stock or another underlying on a particular date for a digital identity 20 representing the underlying, the data item is associated with the digital identity 20 representing the underlying. If a data item 19 is associated with one of the stored digital identities 20, the digital identity manager 25 checks if the data item is included in one of the arrays of that digital identity, and if not, updates that digital identity 20 with that data item. When checking whether the data item is included in the digital identity, the digital identity manager 25 can utilize the copy of the digital identity stored in the data storage 11, the blockchain storage 12, or both. If a data item 19 is not associated with one of the existing digital identities 20, the data item 20 can be used to create at least one new digital identity 20 using at least one of the digital identity templates 14. The data item 19 can be used immediately, or at a later time. For example, if the number of data items 19 that can be inserted into a particular digital identity template meets a predetermined threshold, the new digital identity 20 can be created immediately. Alternatively, if not enough data items that can be associated with a particular template 14 have been received, the data items 19 associated with a particular template can be stored for later use when additional data items 19 are associated with that template are received.

The digital identity manager 25 initially implements the changes to the digital identities (both updating of existing digital identities 20 and creation of new digital identities 20) to the data storage 11 and then updates the digital identities 20 in the blockchain storage 12 to match the digital identities 20 in the data storage 11 by creating new blocks 32 within the blockchain storage. In one embodiment, the updating can be done at predetermined time intervals. In a further embodiment, the updating can happen right after the changes are done to the digital identities 20 in the data storage 11. In both embodiments, each time the digital identities 20 in the blockchain storage 12 are utilized, whether the digital identities 20 in the data storage 11 and the blockchain storage 12 match is checked by the digital identity manager 25.

The digital identities 20 provide a machine-readable data object that can be interpreted by the servers 13 in a computationally-efficient manner. To further increase the computational speed, modeling and deployment flexibility, and ease of access of data included as part of the encrypted digital identities 20 without decreasing their security, the digital identity manager 25 creates one or more derivatives archetypes 21 using one or more derivatives archetype templates 16. Each derivatives archetype 21 has a unique identifier and includes a machine-readable reference to one or more locations of the digital identity 20 for a derivative instrument, a machine-readable reference to one or more locations of the digital identity 20 for the underlying of the derivative instrument, a machine-readable reference to one or more locations of digital identities 20 of data items 19 in accordance with the data structure 33 used within the derivatives archetype, a machine-readable reference to one or more locations of data items 19 in accordance with the data structure 33 used by at least one pricing engine 26 deployed for the pricing of the derivative instrument, machine-readable reference to one or more locations of the digital identities 20 of parties that have the rights to access the information related to the underlying, and machine-readable reference to a location of a pricing archetype. When using the digital entities 20 stored in the blockchain storage 12, the digital identity manager 25, the transaction manager 27, the pricing engine 26, and any other modules implemented by the one or more servers 13 must reference both the copy of the encrypted digital identity 20 stored in the blockchain storage 12 and the copy of that same digital identity 20 stored in the data storage 11 to make sure that the identities 20 match and that the digital identity 20 in the blockchain storage 12 does not need updating. Accordingly, in one embodiment, when all of the digital identities 20 are stored in both the blockchain storage 12 and the data storage 11, the references to locations within the digital archetype are both to the location of the same digital identity 20 in the blockchain storage 12 (such as an identification of particular blocks 32 within the blockchain) and the data storage 11 (such as a particular entry within a master database included in the data storage 11 that is managed by a database management system). In a further embodiment, some of the digital identities can be stored only in the data storage 11 and some in both the blockchain storage 12 and the data storage 11. In a still further embodiment, all of the digital identities are stored within the data storage 11 and thus the derivatives archetype 21 references only a single location for each digital identity 20 (within the data storage 11), but in that embodiment all of the digital identities 20 are encrypted using the multi-primitive crypto mapping and all of the encryptions must be recorded in the write-only crypto transaction data repository 36 to insure that no party, including system administrators or system management or other technical interfaces or procedures can alter or meddle with the track record or the chain of events concerning any transaction on the platform 31 in conformity with the preset parameters and standards for information security, performance, operational integrity, functionality scope or standardization related to technical, compliance, auditing and other domain-specific requirements of the platform 31. The derivatives archetype template 16 has all the information as in the derivatives archetype except for the unique identifiers of the particular set of digital identities, pricing archetypes, and also portions of the metadata when a derivatives archetype is created are also blank.

The pricing archetype 22 referenced in the derivatives archetype 21 could be pre-existing or created specifically for that derivatives archetype 21. For example, if all of the existing pricing archetypes 22 stored on the platform are for an American-style options, but the derivative instrument referenced in the derivatives archetype 22 is a European option, a new pricing archetype would be created to be referenced in the derivatives archetype 21 referencing the digital identity 20 for that European option. The digital identity manager 25 creates the pricing archetype 26 that is referenced within the derivatives archetype 21 using one of the pricing archetype templates 17. Each pricing archetype 22 includes a formula for estimating price of the derivative instrument, one or more fixed elements of the formula (such as values for particular coefficients used within the formula), and machine-readable reference to one or more locations of the digital identities 20 of the data elements, or to locations of data items 19 in accordance with the data structure 33. Both the pricing archetype 22 and the derivatives archetype 21 are encrypted and stored within the data storage 11 and the blockchain storage 12. The pricing archetype template 17 includes all information as the resulting pricing archetype except for the machine-readable references to the location of the digital identities 20, and also portions of the metadata when a pricing archetype is created are also blank. The references to the one or more locations can be both within the blockchain storage 12 and the data storage 11 in the same way as described above with reference to the derivatives archetype 21.

A digital identity 20 for a single derivative instrument can be associated with one or more of the derivatives archetypes 21 and pricing archetypes 22. For example, because the pricing of the same derivative instrument can be determined using different formulas that are included in different pricing archetypes 22 and which are in turn referenced by different derivatives archetypes 21. However, if a digital identity 20 for a derivative instrument is not associated with any derivatives archetype 21, the derivatives archetype 21 needs to be created as described above. Further, if the digital identities that are included in the derivatives archetype 21 or the pricing archetype 22 are in turn updated due to the the additional data items 19 being validated on the platform, which in turn causes the most-recent locations of these digital identities in the blockchain storage 12 to change due to the addition of new blocks 32, the references to these locations are updated in the derivatives and pricing archetypes 21, 22. As further described below, a new smart contract 23 is created upon update or creation of a new derivatives archetype 21.

The digital archetype 21 and the pricing archetype 22 are used by at least one pricing engine implemented by the one or more servers 13 to determine the price of the derivative instrument referenced in the derivatives archetype, as further described below. In one embodiment, the price and other metrics associated with the derivative instrument can be determined as follows.

During the creation by the digital identity manager 25 of the digital identities 20 from the data items 19 received in the data feed, one or more of the digital identity templates 14 are used to create encrypted digital identities 20 for descriptive information derived from publicly available data sets with structured or unstructured data such as news streams, message boards, social media comments, though other kinds of descriptive information is also possible. The digital identities 20 associated with this descriptive information include scores (numerical values) derived from the descriptive information based on preset quantitative and qualitative metrics and formulas for mapping the quantitative and qualitative date to a time series of the scores, with the formulas and metrics being included as part of the metadata of the digital identity template 14 used to create these digital identities. For example, a certain formula can assign: (a) one weight coefficient to one or more measures of the market analysts sentiment towards the prospects for growth of the industry or the sector of a private equity company the value of which is the underlying of the derivative instrument where the calculation of these sentiment measures are also extracted via preset formulas and procedures; (b) another weight coefficient to one or more measures of the user sentiment towards the growth dynamics for the utilization of goods and services in the industry or the sector of a private equity company the value of which is the underlying of the derivative instrument where the calculation of these sentiment measures are also extracted via preset formulas and procedures; (c) yet another weight coefficient to one or more metrics measuring macroeconomic parameters relevant to the industry or the sector of a private equity company the value of which is the underlying of the derivative instrument, and the formula to provide a score based on the above.

Further, during the creation of the digital identities from the data items 19 received in the data feed by the digital identity manager 25, one or more of the digital identity templates 14 are used to create encrypted digital identities 20 for price proxies for the value of the underlying of a derivative instrument or of the cash-flow streams derived from the underlying of a derivative instrument. A price proxy is a factor that has been statistically shown to correlate to the value of the underlying of the derivative instrument or the cash flow streams derived from the underlying of the derivative instrument. For example, if the price of gasoline on a given day has been shown to have a statistical correlation with the value of the underlying or the cash flow streams derived from the underlying that exceeds a certain threshold, the price of gasoline can be set as one of the price proxies for which the digital identity 20 is prepared.

Where the proxy is for the value of the underlying of a derivative instrument, the digital identities 20 associated with the proxies include a unique identifier for the relation of the price proxy to a unique underlying of a derivative instrument. The digital identities 20 associated with the proxies also include machine-readable references to data items 19 in the data storage 11 that include data representing data points or time series of qualitative characteristics of the underlying of a derivative instrument, such as sector attribution, size range attribution, region of revenue generation attribution, EBITDA, sales growth, based on mathematical formula preset in the digital identity template and or the pricing archetype referenced by the digital identity template. The digital identities 20 for the proxies also include machine-readable reference to the scores (numerical values) derived from the descriptive information based on preset quantitative and qualitative metrics and formulas for mapping the quantitative and qualitative data to a time series of the scores as referenced above.

Where the digital identity 20 is for a price proxy for the value of the cash-flow streams derived from the underlying of a derivative instrument, the pricing engine 26 performs cash-flows mapping and stores results of the cash flow mapping in a multi-dimensional array of numbers and descriptive data as part of pricing data 34, where the cash-flow mapping includes replicating portfolio of publicly traded securities and derivatives thereto that have been identified to match the expected cash-flows of the underlying of the derivative instrument, based on mathematical formula preset in the digital identity template 14 used to create the digital identity for the value of cash-flow streams.

The digital identity manager 25 further creates digital identity 20 using a digital identity template 14 for a time series of values representing the difference between individual time series entries for a price proxy and the corresponding entries for the underlying of the derivative instrument, wherein the difference is determined by the pricing engine 26 via statistical modeling based on mathematical formula for the value representing the difference and wherein the result represents a non-Gaussian model return characteristics of the underlying of the derivative instrument where said mathematical formula is preset in the digital identity template 14 and or the pricing archetype 22 referenced by the digital identity template 14. The digital identity 20 representing the difference between a price proxy and the corresponding underlying of a derivative instrument is used by the pricing archetype 22 (in accordance with the formula included in the pricing archetype 22) to determine the price (or some other metric) concerning the derivative instrument referenced in the derivatives archetype 21 associated with that pricing archetype 22. When calculating the price using the pricing archetype 22, the pricing engine 26 has to reference both the digital identity representing the difference between a price proxy and the corresponding underlying of a derivative instrument as well as one or more of the digital identities referenced in the derivatives archetype 21 (such as the digital identities for the derivative instrument and data items 19 used during the calculations). Due to the digital identities 20 including the required data (that is heterogeneous in origin) in a homogenous format and due to the grouping of references of such data within the derivatives archetype 21, the pricing engine is able to quickly and efficiently perform the calculations and the data utilization and management routines necessary to determine the price without having to spend computational resources to individually process the heterogeneous data where most or all of the technical procedures and activities related to searching, filtering, sorting, and performing iterative checks and or normalization, applicable to the data management and utilization, are not mandatory for the processes and procedures on the platform 31.

In one embodiment, the statistical modeling used to determine the values representing the difference between a price proxy and the corresponding underlying of a derivative instrument can be done, without limitations, by adjusting the stochastic behavior of the price proxy to accommodate the illiquid nature of the underlying of a derivative instrument, or extracting a private-component residual via a regression or other models, including via machine learning, based on mathematical formula preset in the digital identity template. The adjusting of the stochastic behavior of the price proxy can be done, without limitation, by applying Bayesian-type models, behavioral type probabilities weighting function or simple adjustment of the distributional representation or parameters, based on mathematical formula preset in the digital identity template.

In a further embodiment, the mathematical formula preset in the digital identity template 14 for values representing the difference between the price proxy and the corresponding underlying of a derivative instrument represents the application of a pricing function that is based on non-Brownian motion Levy processes.

In the case when a smart contract shall govern the actual pricing of a derivative instrument and the trading of the derivative instrument based on the derived bid/ask prices and implied valuations and analytics, the pricing data 34 and the digital archetype 21 associated with that pricing data are then combined with the smart contract template 15 associated with that digital archetype by the transaction manager 27 implemented by the one or more servers 13 to create a smart contract 23. For example, the smart contract template 15 creates a smart contract 23 by utilizing a derivatives archetype 21 that is referencing a pricing archetype 22 when at all times the pricing engine 26 is deployed to reference digital identities 20 prescribed within the derivatives archetype 21 as well as, if necessary, data items 19 stored in the data storage 11 outside of the digital identities 20, thus delivering a series of pricing data 34 that can explicitly be used as values or time series of values for the derivative instrument and to be further referenced by other smart contracts 23 governing the relationships between agents that become long and short parts to derivative trading contracts for the derivative instruments. Due to the grouping of the necessary data within the derivatives archetypes and the referenced digital identities, the smart contract 23 creation can take place in real-time as soon as all necessary data is received into the platform 31 and the digital identities are created and encrypted, and while this data remains relevant and up-to-date. Optionally, prior to being incorporated into a smart contract 23, the derivative instrument is tokenized by the transaction manager 27. The tokenization can be accomplished by the issuance of digital tokens to be stored on the blockchain storage 12 where each of these tokens represents a preset fraction of the price of the derivative instrument as derived from the pricing archetype 22 at any given time, though other tokenization techniques are also possible. The tokenization allows the transactions involving the digital archetype to occur using cryptocurrency such as bitcoin, though other cryptocurrency can also be used.

Once the smart contract 23 associated with the digital archetype is created, the transaction manager 27 governs the trading transactions involving the derivatives archetype 21 and the derivative instruments governed by it and reporting of such transactions in accordance with the terms of the smart contract 23 referenced in the derivatives archetype. Data items 19 and transaction data 35 regarding the transactions that are not part of the smart contract can be stored as part of the data storage 11. Similarly to the digital identities 20, when the smart contract 23 is referenced, the transaction manager 20 would access both the copy of the smart contract 23 on the blockchain storage 12 and the copy of the smart contract 23 stored in the data storage 11 to make sure that they match and updates the blockchain storage 12 copy of the smart contract 23 prior to use if they do not match.

In both the data storage 11 and in the blockchain storage 12, the digital identities 20, derivatives archetypes 21, the pricing archetype 22, and the smart contracts 23 are encrypted at all times. The encryption is done using an encryption data 18 that can be stored in both the data storage 11 and the blockchain storage 12. The encryption data 18 includes multiple variations of combinations of individual elements (crypto primitives) of some or all of the same six classes of crypto primitives: 1) Cipher (encryption algorithm); 2) Concatenating mode (block cipher operation mode); 3) Hash function; 4) Key deviation function; 5) Initializing vector; and 6) Salt parameter. The encryption is performed using the encryption function 18 by the encryption module 30 implemented by the one or more servers 13 and under control of other modules executed by the one or more servers 13 (such as the digital identity manager 25). In one embodiment, the encryption module 30 uses the encryption data 18 to execute a one-way (also referred to as "one-directional") hashing function to encrypt the relevant item (with the item being encrypted being in one embodiment, an object such as a digital identity 20, a derivatives archetype 21, a pricing archetype 22, or a smart contract 23, or, in a further embodiment, components of those items such as standardized units of information structure). Between when executing the one-way cryptographic function for different items, the encryption module 18 only utilizes and changes the cipher and the hashing function, picking the same or different variations of the values and or settings from the available subsets for these two classes of crypto primitives for each encryption. In a further embodiment, the encryption module 30 uses the encryption data 18 to perform a multi-primitive crypto mapping on an item that needs to be encrypted (with the definition of an item being the same as given above when discussing the one-way hashing function). When performing the multi-primitive crypto mapping, the encryption module 30 dynamically combines values and or settings from the available subsets for more than two classes of crypto primitives of the encryption data 18 for each item being encrypted and records the particular combination of the components used for that item in an encrypted, write-only crypto transaction data repository 36 on both the data storage 11 and the blockchain 12 that can be accessed only outside the platform and that can be used for auditing performed encryptions and the logs of transactions and data transfers across the platform 31. Combinations of components used by the one-way cryptographic hash can also be recorded in the write-only crypto transaction repository 36. Due to the tens of thousands of possible combinations of crypto primitives' values, the security of the encryption is exponentially increased when compared to the one-way function. This increase in the scope and level of security enabled by the complexity of the encryption apparatus and methods allows to implement the blockchain storage 12 using technology that is both faster (working in real time with considerably lower than the standardly observed latencies due to the implementation of low-level communication protocols) and cheaper than would otherwise be necessary.

Further, while the blockchain storage 12 provides an increased security and verifiability of the information being referenced when compared to the data storage 11, referencing the values stored in the blockchain storage 11 generally takes longer and consumes more computation power than referencing data stored in the data storage 11. As described in the background section of this application, conventional techniques for improving the speed of accessing blockchain records is by storing different types of homologues data together—thus, images tend to be stored with images and mathematical equations tend to be stored with mathematical equations. However, this approach falls short when different types of heterogeneous data need to be accessed at the same time, as is the case when preparing and executing smart contracts 23 involving private equity assets whose value can change almost instantaneously, and does not provide the speed necessary for real-time operations that are required for such smart contract creation and execution. By grouping together data that is originally heterogeneous but that can be used for the same function in the same of derivatives archetypes 21 and pricing archetypes 22, the platform 31 provides real-time responses in the private equity smart contract scenarios while utilizing the security of the blockchain. Even if encrypted data is stored in the data storage 11, the use of multi-primitive crypto mapping ensures that such an adequate level of security is achieved.

While at least external computer 29 is shown as a server, other types of computer devices are possible, such as servers, desktop computers, laptop computers, mobile devices such as tablets and smartphones, though still other types of computing devices are possible. Further, the one or more servers 13 can be implemented in a cloud-computing environment, or can be implemented as dedicated computing devices (including through various personal computing devices). The servers 13 can include one or more modules for carrying out the embodiments disclosed herein. The modules can be implemented as a computer program or procedure written as source code in a conventional programming language and is presented for execution by the central processing unit or a graphics processing unit (GPU) as object or byte code. Alternatively, the modules could also be implemented in hardware, either as integrated circuitry or burned into read-only memory components, and each of the servers can act as a specialized computer. For instance, when the modules are implemented as hardware, that particular hardware is specialized to perform the computations and communication described above and other computers cannot be used. Additionally, when the modules are burned into read-only memory components, the computer storing the read-only memory becomes specialized to perform the operations described above that other computers cannot. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

In one embodiment, the templates 14-17 are all generated by the platform 31, such as based on user input. In a further embodiment, some of the templates 14-17 can be received from a third party via the Internetwork 28, validated by the servers 13 that they conform to all the requirements for the specific type of template 14-17, and if conforming to the requirements, used for the creation of the relevant objects (digital identities 20, derivatives archetype 21, pricing archetype 22, and the smart contracts 33).

Derivatives archetypes and pricing archetypes allow the servers of the platform 31 to quickly locate data necessary for creation of a smart contract 23. FIG. 2 is a flow diagram showing a method 50 for blockchain-verified digital-identity-and-derivatives-archetype-based transaction processing and implementation with the aid of a digital computer in accordance with one embodiment. The method 50 of FIG. 2 can be implemented using the system 10 of FIG. 1. Digital identity templates 14, smart contract templates 15, data structure 33, derivatives archetype templates 16 and pricing archetype templates 17 are maintained in the data storage 11 (step 51). Optionally, if created during previous iterations of the method 50, in the data storage 11 and in blockchain storage 12 are maintained one or more digital identities 20, derivatives archetypes 21, pricing archetypes 22, and smart contracts 23 (step 52). A data feed including one or more data items is received by one or more of the servers 13 (step 53). The one or more servers 13 map the data items 19 in the data feed to the data structure 33 (step 54). An iterative processing loop performed by the one or more servers 13 (steps 55-61) is initiated for each received data item (step 55). Whether the data item 19 conforms to the data structure 33 taxonomy is validated (step 56), and if not, the data item 19 is deleted and the loop moves to the next data item 19. If the data item 19 does conform to the data structure 33 taxonomy (step 56), whether the data item 19 is associated with one or more of the stored digital identities 20 is determined (step 58). If no (step 58), the loop moves to the next data item 19. If yes (step 58), whether that data item 19 is included in one of the arrays of the associated digital identities 20 is determined (step 59). If yes (step 59), the loop moves to the next data item. If no (step 59), the digital identities 20 associated with that data item 19 and that do not include that data item are updated with that data item 19, first in the data storage 11 and then, in the blockchain storage 12, with the blockchain storage 12 being updated either immediately, or at some time interval, or upon a call from the built-in procedure implemented by the one or more servers 13 that requires checking and maintaining the up-to-date status of the data on the blockchain storage 12 every time that data on the blockchain storage 12 is utilized (step 60). The loop moves to the next data item 19 (step 61). When all of the data items 19 have been processed through the loop of steps 55-61, whether there are enough data items 19 not associated with one of the stored digital identities 20 to create new digital identities 20 is determined by the one or more servers 13 (step 62). If yes (step 62), one or more new digital identities 20 are created, encrypted, and stored within the data storage 11 and the blockchain storage 12 by the one or more servers 13 as described above with reference to FIG. 1 (step 63), and the method moves to step 64. If no (step 62), the method moves to step 64, where any data items not used for creation of the new digital identities 20 are stored by the one or more servers 13 in the storage for later use (including for creating new digital identities 20 when additional data items 19 are received in further data feeds and the threshold for creating the new digital identities is met by combining the data items 19 received at different times).

Whether either an update of the existing derivatives archetype 21 or pricing archetype 21 or a creation of a new derivatives archetype 21 or pricing archetype 22 is necessary is determined (step 65). An update would be necessary if any of the digital identities referenced in the pricing archetype 22 or the derivatives archetype 21 have been updated and their location in their blockchain storage 12 has changed, with an update to the pricing archetype 22 whose blockchain storage 12 location is referenced in a derivatives archetype 21 also necessitating an update to that derivatives archetype 21. A creation of a new derivatives archetype would be necessary if a digital identity 20 for a derivative instrument for which no current derivatives archetype 21 exists has been created and for which a smart contract 23 should be created. If yes (step 65), the method 50 moves to step 66. If no (step 65), the method 50 ends.

Whether the digital identities 20 in the data storage 11 match the digital identities 20 stored in the blockchain storage 12 is determined by the one or more servers 13 (step 66), and if at least some of the identities don't match, the digital identities 20 in the blockchain storage 12 are updated via creation of additional blocks 32 with additional digital identities 20 matching the digital identities 20 in the data storage 11 by the one or more servers 13 (step 67), with the method 50 moving to step 68. If yes (step 66), the method moves to step 68.

Whether one of the existing pricing archetypes 22 need to be updated and whether the existing pricing archetypes 22 fit a new derivatives archetype 21 if one is being created is determined by the one or more servers 13 (step 68). The determination for need to update existing pricing archetypes 22 is made based on whether the locations in the blockchain storage 12 of the digital identities 20 referenced in that pricing archetype have changed. The determination of whether a new pricing archetype is necessary can be made based on the type of the derivative instrument whose price the pricing archetype 22 can be used for determining and the type of the derivative instrument whose digital identity is to be referenced in a new derivatives archetype if one is to be created. If yes (step 68), the method 50 moves to step 69, where the one or more servers 13 perform at least one of any necessary updating to existing pricing archetypes 22 and creation of any necessary new pricing archetypes 22, as well as encryption and storage of the pricing archetypes in the data storage 11 and the blockchain storage 12 (step 69). If no (step 68), the method moves to step 70, where the one or more servers 13 perform at least one of any necessary updating of one or more existing derivatives archetypes 21 updated (with one or more of updated blockchain storage 12 locations of one or more digital identities 22 and updated blockchain location of an updated pricing archetype 22) and creation of any new derivatives archetypes using the appropriate derivatives archetype template 16 and references to locations of digital identities 20 and one of the pricing archetypes 22 (previously-existing or newly created).

The updated or newly-created derivatives archetypes 21 are encrypted and stored by the one or more servers 13 within the data storage 11 and the blockchain storage 12 (step 71). The pricing archetypes 22 are used to determine the price of the derivative instrument referenced by all of the updated or newly-created derivatives archetypes 21, as described above with reference to FIG. 1, by the one or more servers 13 (step 72). At least one smart contract 23 for a derivative instrument is created based on each of the updated or newly-created derivatives archetypes 21 referencing that derivative instrument and the price of that derivative instrument by the one or more servers (step 73). The derivative instruments are made available for exchange transactions in accordance with the corresponding newly-created smart contracts 23, including in accordance with the digital identities 20 for parties who can get access to the relevant data and participate in the transactions involving the derivative instruments that are listed in the derivatives archetypes incorporated into the smart contracts 23 by the one or more servers 13 (step 74). The outcome of the exchange transactions is reported in accordance with the smart contract (step 75), terminating the method 50.

While the invention has been particularly shown and described as referenced to the embodiments thereof, those skilled in the art will understand that the foregoing and other changes in form and detail may be made therein without departing from the spirit and scope.

The invention claimed is:

1. A system for blockchain-verified digital-identity-and-derivatives-archetype-based transaction processing and implementation with the aid of a digital computer, comprising:

a data storage configured comprising one or more digital identity templates, and one or more smart contract templates, a data structure comprising a preset taxonomy, and one or more of a plurality of digital identities encrypted using an encryption algorithm, each digital identity comprising at least two data arrays and metadata comprising a connection between at least two of the arrays and machine-readable instructions for processing the digital identity by one or more processors, the data storage further configured to store derivatives archetype templates, and pricing archetype templates;

a blockchain storage configured to store and implement a distributed ledger comprising a plurality of blocks encrypted using the encryption algorithm, each of the blocks comprising a cryptographic hash of an immediately preceding one of the blocks in the ledger, at least some of the blocks comprising one of the encrypted digital identities; and the one or more processors interfaced to a memory within which code for execution by the processor is stored, the one or more processors interfaced to the data storage and the blockchain storage and configured to:

receive a data feed from at least one external data source, the data feed comprising one or more data items, at least some of the data items associated with an underlying private equity asset ("underlying") of a derivative instrument, at least some of the data items associated with the derivative instrument, at least some of the data items associated with an identifier of the external source, and at least some of the data items comprising an identification of a party who produced at least a portion of the data feed;

map the received data items to the data structure, confirm that the data items conform to the data structure taxonomy, and store the conforming data items within the data storage in accordance to the mapping;

determine using the mapping whether at least some of the data items are associated with one or more of the digital identities;

for those of the data items that are associated with at least one of the digital identities, determine whether those data items are included in one of the arrays comprised in that digital identity;

update the digital identities within the blockchain storage and within the data storage using the data items associated with those digital identities and that are not comprised in one of the arrays of the digital identities;

use at least some of the data items not associated with the digital identities to create further ones of the digital identities using one of the digital identity templates;

encrypt the further ones of the digital identities with the encryption algorithm and store the further ones of the digital identities within the data storage and the blockchain storage;

create a pricing archetype using one of the pricing archetype templates, the pricing archetype comprising a formula for estimating a price of the derivative instrument, one or more fixed elements of the formula, and machine-readable reference to a location within at least one of the data storage and the blockchain storage of digital identities of the data items to be used by at least one engine deployed for pricing of the derivative instrument;

encrypt the pricing archetype with the encryption algorithm and store the pricing archetype within the blockchain storage and the data storage;

compare the digital identities within the data storage to the digital identities within the blockchain storage;

upon the digital identities in the data storage being identical to the digital identities within the blockchain storage, create a derivatives archetype using at least some of the digital identities and one of the derivatives archetype templates, the derivatives archetype comprising machine-readable references to locations of items comprising: the digital identity for the derivative instrument, the digital identity for the underlying of the derivative instrument, digital identities of the data items to be used by the engine deployed for the pricing of the derivative instrument, digital identities of parties that have the rights to access information related to the underlying, and the pricing archetype, wherein at least some of the references list both the location within the blockchain storage of one of the items and the location within the data storage for that item;

encrypt the derivatives archetype using the encryption algorithm and store the derivatives archetype within the blockchain storage and the data storage;

use the pricing archetype to determine the price of the derivative instrument referenced within the derivatives archetype;

create at least one smart contract for the derivative instrument using the derivative instrument price and the derivatives archetype referencing the derivative instrument, wherein the locations of at least some of the items within both the blockchain storage and the data storage are accessed during the creation of the smart contract;

make the derivative instrument available for exchange transactions between multiple parties eligible to access data associated with the derivative instrument using the smart contract;

report outcome of each of the exchange transactions in accordance with the smart contract.

2. A system according to claim 1, wherein all of the references within the derivatives archetype list both the location within the blockchain storage of one of the items and the location within the data storage for that item.

3. A system according to claim 1, wherein the smart contract governs disclosure of data associated with one or more of the derivatives archetype, the external data source, and the party who produced at least a portion of the data feed.

4. A system according to claim 1, wherein the smart contract governs trading of the derivative instrument.

5. A system according to claim 1, wherein the smart contract governs disclosure of information relating to at least one of the derivative instrument or the underlying.

6. A system according to claim 1, the one or more processors further configured to tokenize the derivative instrument, wherein the trading of the derivative instrument is performed using cryptocurrency.

7. A system according to claim 6, wherein the tokenization is performed based on the smart contract.

8. A system according to claim 1, wherein the smart contract governs utilization of the digital identities associated with the pricing archetype and updating of the pricing archetype.

9. A system according to claim 1, the one or more processors further configured to:
receive further ones of the digital identity templates from the external source;
receive further ones of the digital archetype templates associated with the further digital identities;
validate the further digital identity templates and the further digital archetype templates;
store the further digital identity templates and the further digital archetype templates in the data storage for use in creation of the digital identities.

10. A system according to claim 1, the encryption algorithm uses encryption data comprising a plurality of crypto primitives comprising one or more of: cipher; concatenating mode, hash function, key deviation function, initializing vector, and a salt parameter.

11. A system according to claim 10, wherein the encryption algorithm uses a one-way cryptographic hash that can vary only the cipher and the hash function and keeps the remaining crypto primitives that are used constant between different instances of use of the encryption algorithm.

12. A system according to claim 1, wherein the encryption algorithm uses multi-primitive crypto mapping that can vary all of the crypto primitives between different instances of use of the encryption algorithm.

13. A system according to claim 1, the one or more processors further configured to store some of the data items not associated with the digital identities in the data storage without creating the further digital identities based on those stored data items.

14. A system according to claim 1, the one or more processors further configured to:
upon the digital identities in the data storage not matching the digital identities in the blockchain storage, updating the digital identities in the blockchain storage based on the digital identities in the data storage via creation of additional ones of the blocks on the distributed ledger.

15. A system according to claim 1, the one or more processors further configured to:
the pricing archetype template prescribes a pricing mechanism for financial derivatives.

16. A system according to claim 14, the one or more processors further configured to:
create, using one or more of the digital identity templates and one or more of the data items, the digital identities for publicly-traded price proxies associated with the derivative instrument, wherein each of the price proxies is statistically correlated with one of a value of the underlying of the derivative instrument or of cash-flow streams derived from the underlying of the derivative instrument, wherein the data items used for the creation of the proxies are derived from publicly available data sets with structured or unstructured data; and
use the digital identities for the price proxies for the calculation of the price of the derivative instrument.

17. A system according to claim 16, wherein the digital identities for the price proxy for the value further comprise:
an identifier for a relation of the price proxy to the underlying of the derivative instrument;
machine-readable references to location in the data storage of data items that comprise data representing at least one of data points or time series of qualitative characteristics of the underlying of the derivative instrument; and
machine-readable reference to locations with the data storage of scores derived from the publicly available data sets based on preset quantitative and qualitative metrics and formulas for mapping quantitative and qualitative data to a time series of the scores.

18. A system according to claim 16, the one or more processors further configured to:
perform cash-flows mapping using the digital identity for the price proxy associated with the cash flow and store results of the cash flow mapping in a multi-dimensional array of numbers and descriptive data, wherein the cash-flow mapping comprises replicating portfolio of publicly traded securities and derivatives thereto that have been identified to match the expected cash-flows of the underlying of the derivative instrument based on mathematical formula preset in the digital identity template used to create the digital identity for the value of cash-flow streams.

19. A system according to claim 16, the one or more processors further configured to:
    create using one of the digital identity templates one of the digital identities for a time series representing a difference between individual time series entries for one of the price proxies and the corresponding entries for the underlying of the derivative instrument, wherein the difference is determined via statistical modeling based on a mathematical formula for the value representing the difference and wherein the result represents a non-Gaussian model return characteristics of the underlying of the derivative instrument and wherein the mathematical formula is in at least one of the digital identity template used to create the digital identity for the time series and the pricing archetype referenced by the digital identity template; and
    use the digital identity for the time series to determine the price of the derivative instrument.

20. A system according to claim 1, the one or more processors further configured to:
    analyze a plurality of further pricing archetypes to determine their suitability for inclusion into the derivatives archetype, wherein the pricing archetype is created upon the further pricing archetypes not being suitable for inclusion into the derivatives archetype, A system according to claim 1, the one or more processors further configured to:
    analyze a plurality of further pricing archetypes to determine their suitability for inclusion into the derivatives archetype, wherein the pricing archetype is created upon the further pricing archetypes not being suitable for inclusion into the derivatives archetype.

* * * * *